(12) United States Patent
Shoemaker et al.

(10) Patent No.: US 9,519,408 B2
(45) Date of Patent: Dec. 13, 2016

(54) SYSTEMS AND METHODS FOR GUIDED USER ACTIONS (71) Applicant: GOOGLE INC., Mountain View, CA (US)

(72) Inventors: Garth Shoemaker, Sunnyvale, CA (US); Michael Eugene Aiello, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 251 days.

(21) Appl. No.: 14/145,596

(22) Filed: Dec. 31, 2013

(65) Prior Publication Data
US 2015/0185995 A1 Jul. 2, 2015

(51) Int. Cl.
G06F 3/048 (2013.01)
G06F 3/0484 (2013.01)

(52) U.S. Cl.
CPC .................... *G06F 3/0484* (2013.01)

(58) Field of Classification Search
CPC ............... G06F 17/18; G06F 17/30345; G06F 17/30424; G06F 17/30474; G06F 17/30477; G06F 17/30554; G06N 7/005
See application file for complete search history.

(56) References Cited

U.S. PATENT DOCUMENTS

| 6,400,996 | B1* | 6/2002 | Hoffberg | G05B 19/0426 370/218 |
| 8,010,676 | B1* | 8/2011 | Battersby | G06F 9/5044 709/226 |
| 2009/0234784 | A1 | 9/2009 | Buriano et al. | |
| 2009/0234876 | A1* | 9/2009 | Schigel | G06F 17/30873 |
| 2011/0196853 | A1 | 8/2011 | Bigham et al. | |
| 2011/0208822 | A1* | 8/2011 | Rathod | G06Q 30/02 709/206 |
| 2012/0226742 | A1* | 9/2012 | Momchilov | G06F 3/0481 709/203 |
| 2012/0290662 | A1 | 11/2012 | Weber et al. | |
| 2013/0091087 | A1 | 4/2013 | Prakash et al. | |
| 2013/0103742 | A1* | 4/2013 | Hsi | G06F 17/30274 709/203 |
| 2013/0117208 | A1 | 5/2013 | Dousse et al. | |

(Continued)

FOREIGN PATENT DOCUMENTS

| JP | 2010250759 A | 11/2010 |
| KR | 1020120045415 A | 5/2012 |

OTHER PUBLICATIONS

MM '05, My Digital Photos: Where and When?, Nov. 6-11, 2005, Singapore.*

(Continued)

*Primary Examiner* — Tadeese Hailu
(74) *Attorney, Agent, or Firm* — Procopio, Cory, Hargreaves & Savitch LLP (57) ABSTRACT

Systems and methods for guided user actions are described, including detecting a first action performed by a user; gathering information associated with the first action; retrieving a predictive model based on the information; determining an applicability level of the predictive model to the first action, the predictive model suggests a second action; providing the second action in a user interface when the applicability level meets a threshold level; and receiving input from the user selecting the second action or a third action.

20 Claims, 7 Drawing Sheets

(56) References Cited

U.S. PATENT DOCUMENTS

| | | |
|---|---|---|
| 2013/0132330 A1 | 5/2013 | Hurwitz et al. |
| 2013/0159220 A1 | 6/2013 | Winn et al. |
| 2013/0218637 A1* | 8/2013 | Bikman ............. G06Q 30/0201 |
| | | 705/7.32 |
| 2014/0059231 A1* | 2/2014 | Choi ....................... H04L 47/70 |
| | | 709/226 |
| 2014/0130076 A1* | 5/2014 | Moore ............. H04N 21/25883 |
| | | 725/19 |
| 2014/0171039 A1* | 6/2014 | Bjontegard ....... H04L 29/06034 |
| | | 455/414.1 |
| 2014/0279793 A1* | 9/2014 | Wohlstadter ....... G06Q 30/0269 |
| | | 706/46 |
| 2014/0372902 A1* | 12/2014 | Bryant .................... G06F 17/30 |
| | | 715/748 |
| 2014/0372905 A1* | 12/2014 | Bryant ............. H04M 1/72566 |
| | | 715/753 |
| 2015/0081470 A1* | 3/2015 | Westphal ........... G06Q 30/0631 |
| | | 705/26.7 |

OTHER PUBLICATIONS

International Search Report and Written Opinion for PCT/US2014/071265, dated Jun. 5, 2015, 10 pgs.

\* cited by examiner

SYSTEMS AND METHODS FOR GUIDED USER ACTIONS

BACKGROUND

Field

The subject matter discussed herein relates generally to data processing and, more particularly, to systems and methods for guided user actions.

Related Background

Users frequently create content, such as new photos, videos, and posts for sharing with family, friends, acquaintances, and other users. However, the sharing process can be cumbersome. For example, even if a user is on an email system or social network with groups or social circles of contacts already set up, the user must manually identify and select the user with whom he or she wants to share a particular photo, video, post, or other content.

For example, a person (e.g., Alice) is on a trip taking photos every day. Alice wants to share some of the photos with her family almost daily. Every time she shares photos with her family, Alice needs to select the photos to be shared, select a method of sharing (e.g., via email, social network, etc.), and select her family as the recipient.

SUMMARY

The subject matter includes methods for guided user actions, including detecting a first action performed by a user; gathering information associated with the first action; retrieving a predictive model based on the information; determining an applicability level of the predictive model to the first action, the predictive model suggests a second action; providing the second action in a user interface when the applicability level meets a threshold level; and receiving input from the user selecting the second action or a third action.

The methods are implemented using one or more computing devices and/or systems. The methods may be stored in computer-readable media.

DETAILED DESCRIPTION

The subject matter described herein is taught by way of example implementations. Various details have been omitted for the sake of clarity and to avoid obscuring the subject matter. The examples shown below are directed to structures and functions for implementing systems and methods for guided user action.

Figure 1:
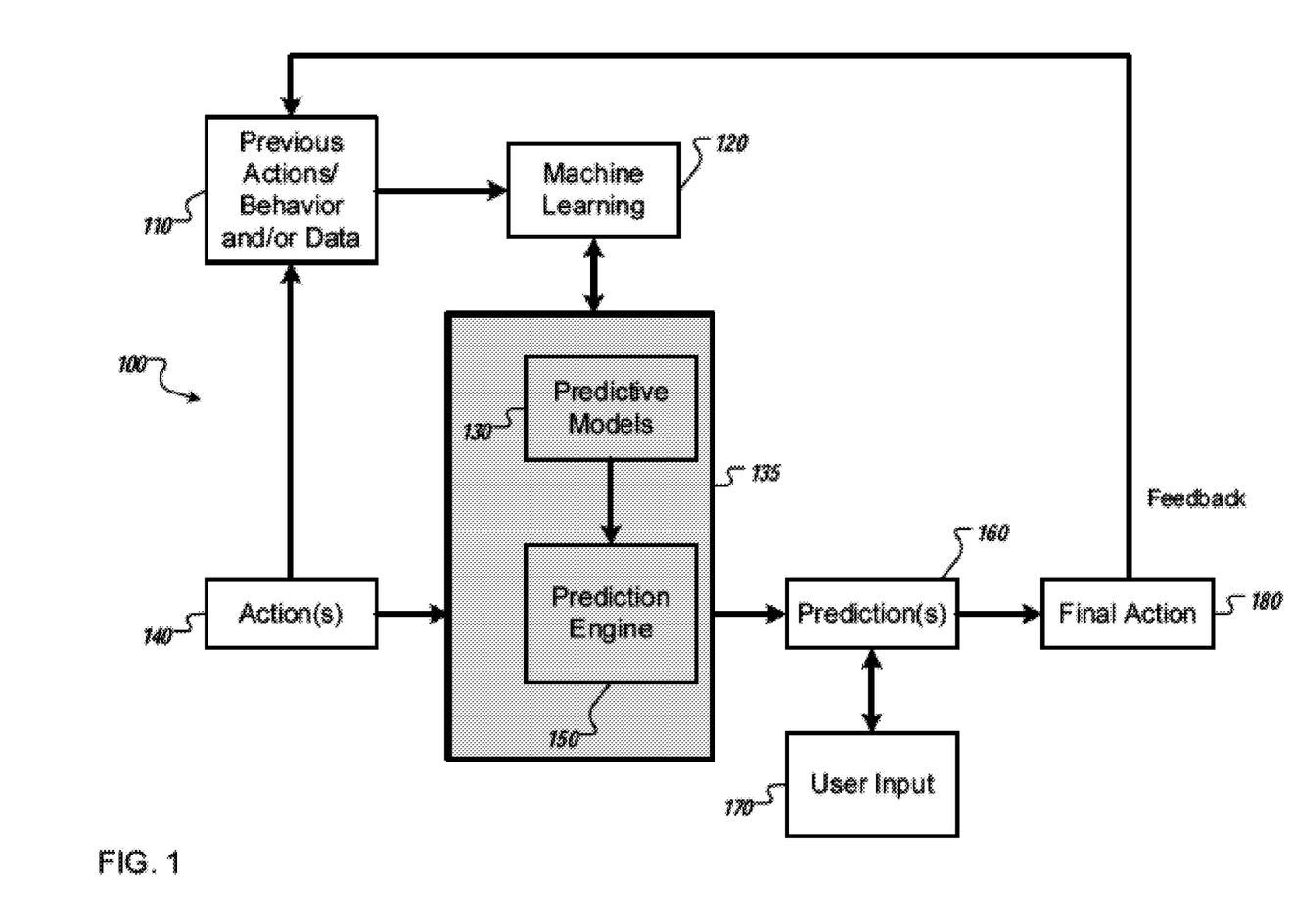
FIG. 1 shows a data flow diagram of an example system according to some implementations.

FIG. 1 shows a data flow diagram of an example system according to some example implementations. System 100 includes a model generation portion 110-130 and a model application portion 130-180. In some implementations, the model generation portion is 110-135, and the model application portion is 135-180, with the functions of predictive models 130 and prediction engine 150 combined into a prediction generator 135. The model generation portion includes, for example, using machine learning 120 to analyze previous actions of a user, the behavior and/or habits of the user, and data associated with the user (collectively referred to as user history 110), and to generate predictive models 130 associated with the user. For example, with the permission of the user, system 100 (e.g., machine learning 120) uses and analyzes past observations of sharing behavior (e.g., past sharing actions) by the user to generate one or more predictions (e.g., predictive models) of the desired audience associated with the user and/or desired sharing methods for new sharing actions by the user. History 110 can be the history of one of more applications, websites, services of different providers, etc. the user has given permissions or consents to gather the user's history and user actions. The model generation portion of system 100 is further described in FIG. 2A below.

Remaining in FIG. 1, in the model application portion of system 100, when the user attempts to share data (e.g., photo, video, etc.) or take one or more sharing actions 140, system 100 (e.g., prediction engine 150) identifies and uses one or more predictive models 130 based on actions 140 to provide the user with one or more predictions 160, which may include one or more action options, such as a sharing prediction (e.g., share with the user's family by email) and one or more other sharing options (e.g., share with the user's family by a user selected method; share with user selected recipients by a predicted method of sharing through the user's social network account; a third sharing option, etc.). Actions 140 become part of user history 110 if the user has given permissions to use actions 140.

The user may provided user input 170 via, for example, a user interface (not shown) to select or change one of the predictions 160 or action options. A user may select a sharing prediction predicted by the prediction engine 150. A user may change some part of the sharing prediction or select one of the other sharing options. The user's selection becomes the final action 180. In some implementations, the final action 180 (e.g., the user's selection) is provided as feedback to the history 110. The model application portion of system 100 is further described in FIG. 2B below.

Sharing content is used as an example to describe the subject matter herein. It should be noted that the subject matter herein applies to all user actions and is not limited to sharing content. For example, one of the user actions may be browsing on the Internet. Many browsers allow users to browse in a private browsing mode (e.g., incognito browsing in Chrome®, InPrivate browsing in Internet Explorer®, Private Browsing in Firefox™ and Safari®).

The model generation portion or system 100 may learn from a user's browsing habits and history to generate one or more predictive models. For example, the user may browse some kinds of websites (e.g., websites of schools, news organization, government, etc.) in open mode and other kinds of websites (e.g., websites relating to personal finance, health, online shopping, etc.) in private mode.

When the user starts browsing a website of a financial institution, system 100 may predict, based on one of more models, that the user may want to browse in private mode and provide the prediction in one of the options. The user may accept that prediction and start browsing in private mode. If the user starts browsing in another mode or changes any part of the prediction, feedback of the user's actions or selections is provided back to system 100 (e.g., history 110) to fine tune the system 100 (e.g., machine learning engine and/or models).

Figure 2A:
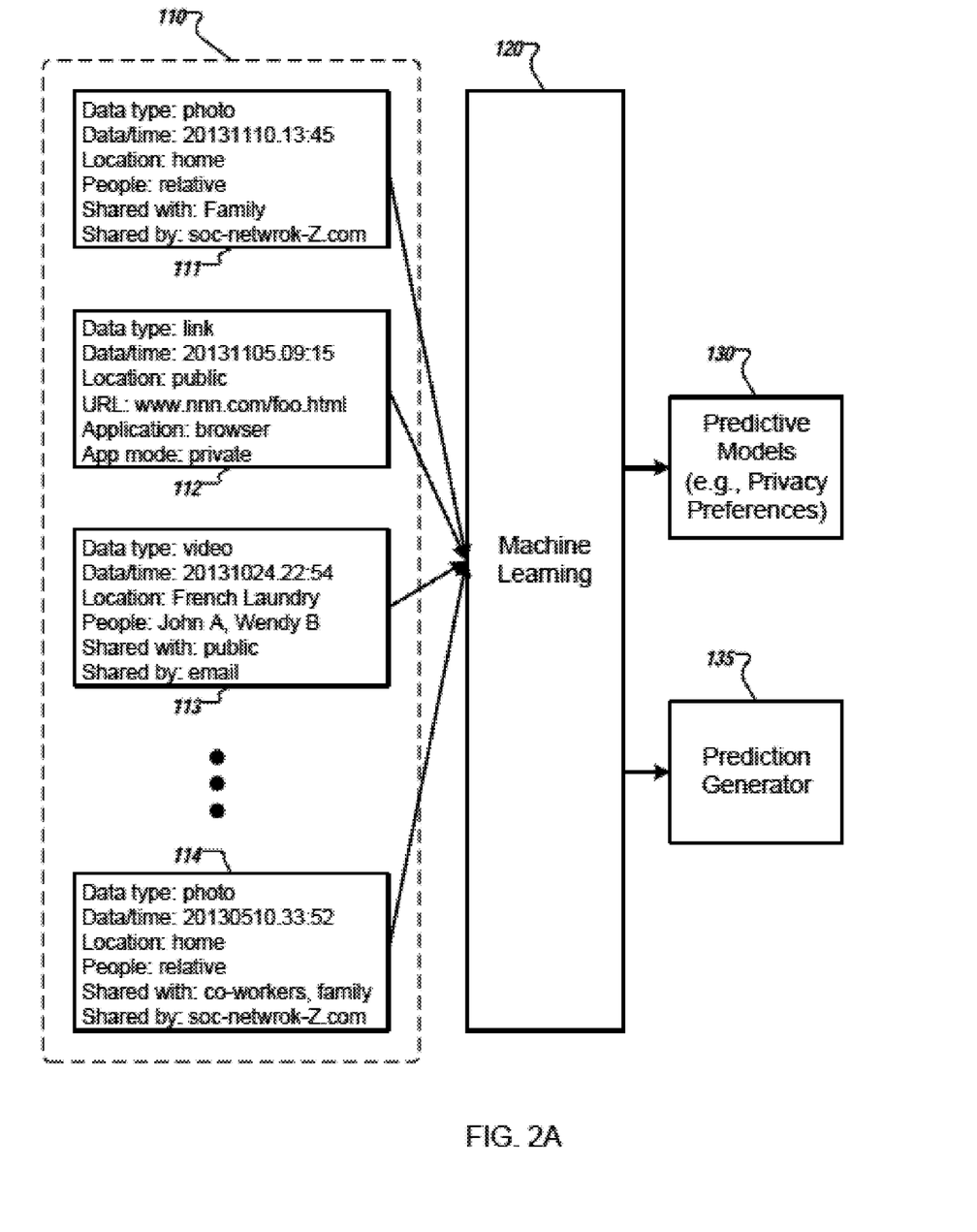
FIG. 2A shows a data flow diagram of an example implementation of predictive model generation.
Figure 2B:
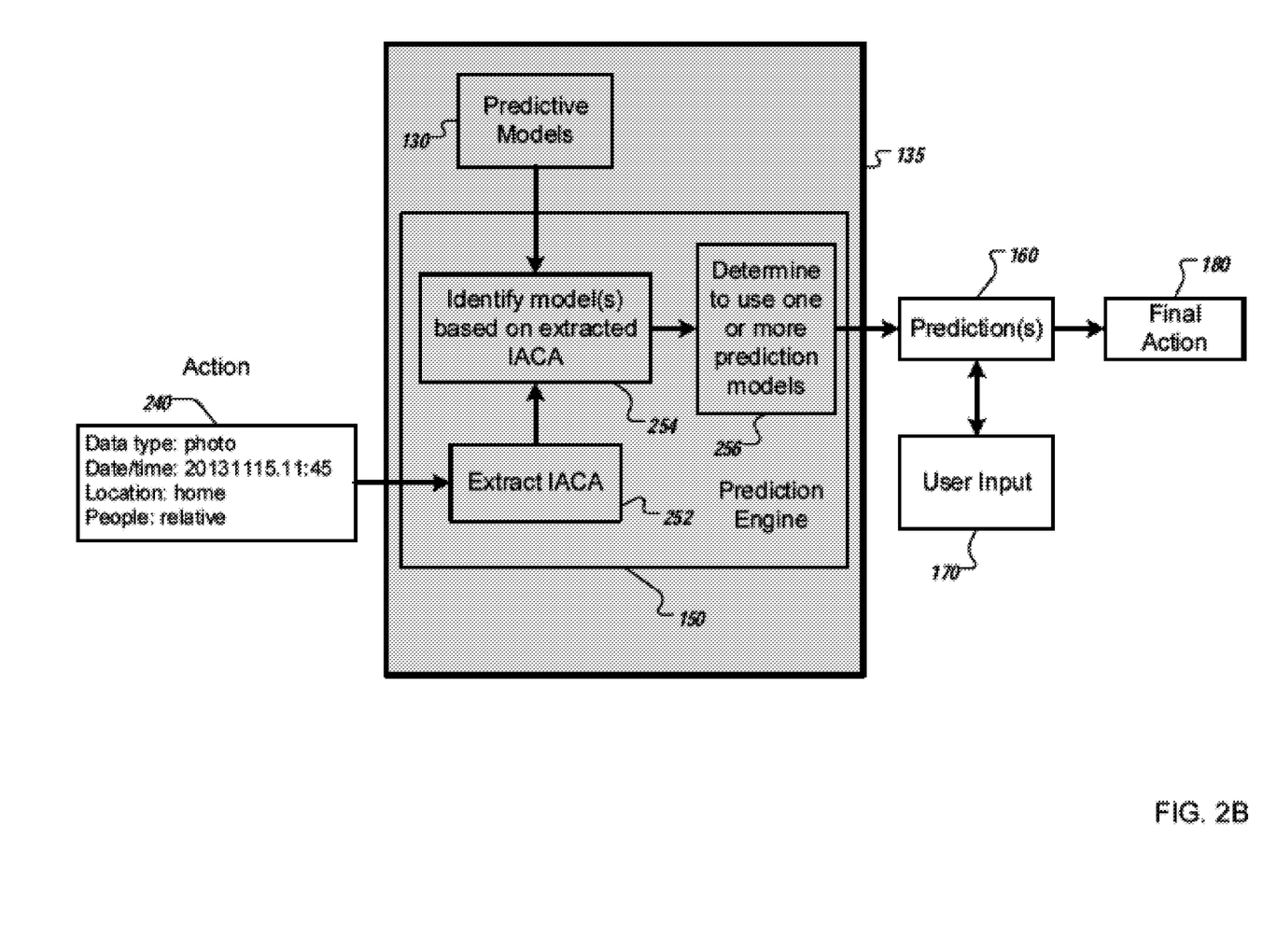
FIG. 2B shows a data flow diagram of example implementations of user action predictions.

FIG. 2A shows a data flow diagram of an example implementation of predictive model generation. User history 110 (e.g., previous actions, behavior, habits, data associated with a user) includes, for example, previous actions 111-114 provided to (e.g., read by) machine learning engine 120 to generate predictive models (e.g., privacy models or preferences) 130. In implementations with prediction generator 135, and with the authorization of the user, user history 110 is input to machine learning 120 to provided output to prediction generator 135. Prediction generator 135 may trigger machine learning 120 to process history 110 and/or provide the output to prediction generator 135. Previous actions 111-114 are represented by the information about content or action (IACA) of the previous actions.

As used herein, "information about content or action" or "IACA" is any information about content, any information about one or more actions taken in association with the content, or both. As used herein, "content" is any digital or digitized content. Content is any collection of information represented in digital form (e.g., represented in binary data). Examples of content include but are not limited to one or more files, document, images, videos, audios, posts, communication messages (e.g., emails, short message tests, video messages, audio messages, etc., any combination thereof), games, any portion thereof, and any combination thereof.

As used herein, "information about content" is any information associating with the content. The information about content can be metadata, which includes but is not limited to application metadata (e.g., metadata defined in a language or a file format, such as HTML (HyperText Markup Language), JPEG (Joint Photographic Experts Group), etc.), descriptive metadata (e.g., description of a resource for identification and retrieval, such as file name, title, author, and abstract, etc.), structural metadata (e.g., relationships within and among object, such as paragraphs, pages, chapters, etc.), administrative metadata (e.g., for managing resources, such as versioning, timestamps, access control, storage directories, or locations, etc.). This information is only used in the example implementation with the consent of the user.

In some example implementations, the information about content includes any data recorded or generated about the content. For example, the information may include a webpage (e.g., the uniform resource locator or URL of the webpage) visited by a user, the last webpage visited by the user (e.g., the referrer, in HyperText Transfer Protocol or HTTP), the time when the webpage is visited, the location of the user when the webpage is visited, the mode of a tool, such as the private mode of a browser, the type of the webpage, whether the webpage requires authentication, etc.

The examples above regarding the webpage and other examples herein in connection with a user are described with the assumption that the implementations obtain the user's consent for recording the described information. If no consent is given by the user in connection with apiece of information, that piece of information is not recorded. In addition, a user may delete data in the user's history 110 or the entire history 110.

Other examples of data recorded or generated about the content include but are not limited to user-generated, device-generated, and application-generated information. For example, user-generated information includes information generated by any user or administrator. A user may provide description, feedback and/or comments about some content. An administrator may record an incident about some content. Device-generated information may include, for example, type of device, resources included in the device, applications used to open the content, states of the device, etc.

Application-generated information may include, for example, text information of an image. The application may be analyzing an image (e.g., pixel data, metadata, and/or vector data) and generate text information about the image. For an image of a picnic in the park, for example, the generated text data may include names or identities of the people in that picture or video (e.g., from facial recognition), description of the image (e.g., "picnic party in a park with trees and grass drinking sodas" from content analysis), and metadata (e.g., the image is taken by a certain model of camera, using a certain f-stop, in a certain image resolution, etc.).

In some example implementations, the information about content includes one or more fields of the content that is structured. For example, if the content is information stored in or retrieved from a database, any fields of the content can be used as information about content. If the content is an email message, and fields (e.g., To, From, Subject, CC, BCC, body, etc.) can be used as information about content.

As used herein, "information about one or more actions" taken in association with the content is any information associating with actions or information about actions. Information about actions includes but is not limited to history usage information (e.g., usage records or usage logs), information about the network, system, devices, operating systems, applications, modules, software, etc. used to perform the actions, information about the environment, date, time, location when the actions are performed, and other available information (e.g., recipient information, languages of the application used to perform the actions, etc.). The information about actions can overlap the information about content in some implementations. For example, whenever a user sets sharing permissions on some content (e.g. a photo, video, post, link), the user's permissions are associated with the content (e.g., stored the permissions as metadata). In some implementations, a user's environment may be recorded with consent given by the user. For example, identities of other known users in the vicinity (by tracking their devices or locations) of the user.

Referring to FIG. 2A, previous actions (e.g., actions 111-114) include, for example, the information about content or action (IACA) as shown in Table 1.

TABLE 1

| | IACA | Action 111 | Action 112 | Action 113 | Action 114 |
|---|---|---|---|---|---|
| 1 | Data type | Photo | Link | Video | Photo |
| 2 | Date/Time | 20131110.13:45 | 20131105.09:15 | 20131024.22:54 | 20130510.33:52 |
| 3 | Location | Home | Public | French Laundry | Home |

TABLE 1-continued

| | IACA | Action 111 | Action 112 | Action 113 | Action 114 |
|---|---|---|---|---|---|
| 4 | Target | Relative | www.nnn.com/foo.html | John A, Wendy B | Relative |
| 5 | Shared with | Family | — | Public | Co-worker, Family |
| 6 | Application | Soc-network-Z.com | Browser | Email | Soc-network-Z.com |
| 7 | Action | Shared | Browsed privately | Shared | Shared |

Table 1 shows an implementation that considers, for example, eight pieces or fields of IACA (rows 1-7). An implementation can consider and IACA information (e.g., any fields and any number of fields). The fields can be different based on content. For example, action 112 includes an URL as a target and a browsed privately action for the data type of a link (e.g., a reference) that are not included or used in actions 111, 113, and 114 with data types of photo and video.

The IACA information shown in actions 111-114 are only examples IACA. There may be different and/or other IACA fields. For example, there may be an IACA device field (not shown) for providing device information, such as a phone, tablet, laptop, or another device.

Even for a given IACA field, such as the location, field, the may be different or other information. For example, for the location field, there may be different or other kinds of location information, such as latitude and longitude, inside or outside of a certain thing (e.g., building), in a private space or public space. There may be different ways of capturing relevant "location" information that can be independent of on another (e.g., can be implemented to any combination or all of location information for using in generating the predictive models 130).

The machine learning 120, which can be a system, a device, an application, or a software module, may be implemented as a black box to process user history 110 to produce predictions or predictive models 130. Machine learning 120 may be implemented in any way to execute instructions of any one or more algorithms. One of the algorithms, for example, may be processing user history 110 (e.g., actions 111-114) to generating "shared with" and/or "shared by" models 130 with a threshold of, for example 50% (e.g., generate a model if the threshold of 50% or above is met).

After actions 111-114 are processed, machine learning 120 generates, for example, the example models shown in Table 2 for predicting who to share content with and/or how to share the content by based on one or more attributes of the content.

action, 112 or 113, respectively. In some implementations, a model is generated only if the data set that supports the model (i.e., the IACA used to generate the model) is of a certain sample size. For example, in the example, of Table 2, if there is a data set size or sample size requirement of 2, models M2 and M3 will not be generated due to insufficient of data set of 1. Model M1 will still be generated due to the data set size of 2 (actions 111 and 114). In some implementations, predictive strength may be estimated based on sample size. Predictive strength may also be estimated by one or more algorithm used by system 100.

The models M1-M3 as well as other models described herein are only examples. In actual implementation, there may be different and/or other models. In addition, different models may be combined into fewer models. Yet in other implementations, models are conceptual models or dynamic models generated on the fly.

As described above, machine learning 120 may be implemented as a black box that provides one or more predictions based on user history 110. One or more of any number of algorithms may be dynamically applied in this black box. What is common is that data 110 (FIG. 2A) goes in and models 130 come out (FIG. 2A). In some implementations, instead of or in addition to models 130, machine learning 120 produces output for prediction generator 135 to generate one or more predictions. For example, in some implementations, some of models M1-M3 may be generated. For example, system 100 (FIG. 1) may be implemented with different pipelines or processes for different domains. One process pipeline may be for browsing (e.g., using one or more browsers); another pipeline may be sharing on a social network; a third pipeline may be relating to email communication; one or more pipelines may be based on content type (e.g., a pipeline for photos, one pipeline for audio and/or video, etc.).

For example, sharing photos, the machine learning algorithm will determine internally what is relevant based on the history data 110 it receives, and provide output to prediction generator 135 to produce the predictions. Similarly, for other

TABLE 2

| | Conditions | Shared with | Shared by/application | Mode |
|---|---|---|---|---|
| M1 | Data type = Photo, or Location = Home, or People = Relative | Family (100%), Co-workers (50%) | Soc-network-Z.com (100%) | — |
| M2 | Data type = Link, or Location = Public, or URL = www.nnn.com | — | Browser (100%) | Private (100%) |
| M3 | Data type = video, or Location = French Laundry, or People = John A, Wendy B | Public (100%) | Email (100%) | — |

Table 2 shows that, for example, three models or predictive models 130 M1-M3 are generated from history 110 (e.g., actions 111-114). For clarity in illustration, four actions 111-114 are shown and described. M1 may be generated using the IACA of actions 111 and 114. M2 and M3 each may be generated using the IACA of only one processing domains, such as browsing, a different machine learning algorithm will determine internally what is the relevant browser setting to use based on the history data 110 machine learning 120 processes.

In actual implementations, history 110 contains information of a much bigger set of usage history and/or user actions. History 110 is likely to grow over time and the amount of information about content or action (IACA) associated history 110 also grows larger. A bigger data set, in general, leads to more accurate models being generated. In implementations that include a data set size, when the data set is sufficiently large (e.g., at least the required data set size), the system can start to make user action predictions based on previous actions (e.g., generating and applying predictive models based on history 110).

As another example, with a user Alice, if 100 of Alice's photos contain Alice's relative, Alice may have shared 90 of the 100 photos Alice's "family" online social circle (e.g., one or more contacts put in a group with a label "family"), and shared 10 of the 100 photos with Alice's "co-worker" online social circle. The system, as authorized by Alice, determines or "learns" that Alice tends to share photos of Alice's relative with Alice's "family" online social circle (e.g., machine learning 120 generates a model M4 based on that learning). If Alice has taken 50 photos at home, Alice may have shared 45 of the 50 photos with Alice's "family" online social circle, and 5 of the 50 photos with Alice's "extended friends" online social circle. The system learns that Alice tends to share photos taken at home with Alice's "family" online social circle (e.g., machine learning 120 generated a model M5 based on that learning). The result is that in aggregate Alice has a multi-dimensional model (e.g., M4 and M5) that is able to associate different kinds of IACA (e.g., location, time of day, identities of people, etc.) with different sharing preferences.

In some implementations, predictive models 130 may be generated based on privacy preferences of a user. These predictive models or privacy preferences models can be used to make predictions of desired privacy sharing setting or preferences. For example, Alice takes a picture of Alice's relative at 3:30 PM in the park and wants to share that (the 3:30 picture). The system analyzes past sharing actions (e.g., history 110) with similar IACA. The system learns that and creates one or more models to the effect of Alice tends to share pictures and videos of Alice's relative with the "family" online social circle (model M6), except when the pictures and videos are taken in public, in which case Alice shares with "extended friends" (model M7). Media (e.g., pictures and videos) captured in the afternoon tends to be shared more widely (model M8). In the example of the 3:30 picture, the privacy preferences models M6 and M7 or M8 lead to a prediction that Alice would want to share the 3:30 picture of her relative with her "family" (M6) and "extended friends" (M7, park=in public, or M8, 3:30 PM=afternoon) online social circles since the picture was captured in a public place during the day. All of the foregoing is performed with the consent of the user.

Depending on implementations, different algorithms can be used to generate models 130, which may be based on privacy preferences of a user. For example, the machine learning black box if "data in, predictions out" can function in many different ways using different algorithms. The algorithms that produce the most accurate predictions (e.g., based on final actions) may be retained or floated to the top of an algorithm application priority queue. The user can decide at any point whether or not to set their privacy preference (e.g., consent) so as to participate in this example implementation.

FIG. 2B shows a data flow diagram of example implementation of user action predictions. A user (e.g., Alice) may have selected a photo as action 240. In some implementation, taking or saving a photo may be considered as action 240, which triggers the process of prediction generator 135 or prediction engine 150.

If prediction engine 150 is implemented, at block 252, IACA associated with action 240 and/or the corresponding photo (e.g., content) is extracted. Some example fields of the extracted IACA may include a data type of photo, a timestamp, a location of home, and an identification of a person on the photo being the relative. At block 254, one or more models are identified or selected based on the extracted IACA. For example, model M1 shown in Table 2, may be identified based on the data type of photo, the location of home, and/or the people being a family member (e.g., relative being the family member in this example implementation).

In some implementations, one or more models may be identified based on actions or potential actions, such as social network sharing, emailing, browsing, etc. In some implementations, models may be selected based on both actions and data type, such as sharing photos on a social network, sharing audio content on a social network, etc.

If more than one model is identified at 254, as in the case of the 3:30 picture above with models M6-M8, a determination is made at block 256 to use one or more of the identified models. One example implementation of block 256 may involve assigning weights to one or more pieces or fields of the extracted IACA. For example, data type can be assigned a weight of X; location, a weight of Y, and people, a weight of Z. If each X, Y, Z is enough to meet a threshold level, then a model with the highest weight is chosen. If it takes the combination of two or more weights, X, Y, and Z to meet the threshold level, then the models that contribute to the sum of weights that meet the threshold level are chosen. If more than one prediction can be predicted from the chosen models, the predictions may be presented to the user in order of decreasing weights or sums of weights, as shown in screenshot 300B, FIG. 3, which is described below. In some implementations, the determination is done not using weights but using different factors, which can be any factors.

If prediction generator 135 is implemented, prediction generator 135 may process existing output from machine learning 120 (FIG. 1) or may request machine learning 120 to provide output on demand or on an as needed basis. For example, prediction generator 135 may process actions 140 as described in box 252. Instead of box 254, prediction generator 135 may request machine learning 120 to generate output from history 110 based on IACA of actions 140. If more than one prediction is generated, the predictions may be prioritized, ranked, or reduced. Machine learning 120 and prediction generator 135 may function as a black box predictive engine that continue to grow based on history 110 and feedback from final action 180. In some implementations, both 135 and 150 may be implemented with different pipelines or processes for different domains. For example, prediction generator 135 may be implemented in the domain of sharing photos, and prediction engine 150 may be implemented in the domain of browsing the Internet.

At block 160, one or more predictions may be presented to the user (e.g., Alice). In some implementations, a user may decide (e.g., through configuration or setting) that if one of the predictions meets a certain level (e.g., has a weight or sum of weights of 80% or 90%), that prediction may be automatically selected and used without the input of a consenting user (e.g., automatically shares the 3:30 picture to Alice's "family" online social circle without presenting the predictions Alice for selection, although Alice has previously consented to use of the system). If one or more predictions are presented to the user at 160, the user may provide input 170 using a user interface (not shown) to identify or select one of the predictions. The user may also provide input (e.g., who to share content with and/or how to share the content by, etc.) that is not in any of the predictions. The user's input may be provided as feedback to, for example history 110 in FIG. 1. Machine learning 120 may incorporate or account for the user's feedback in generating models and/or to changes one or more models already generated. In some implementations, predictive models 130 may be managed by a manager that changes or deletes one or more models based on the user feedback.

As with the foregoing example implementations, the user remains in control of whether this feature is used (e.g., consent), and can at any time decide to not use this feature.

At block 180, the final action is taken, such as sharing the 3:30 picture to Alice's "family" online social circle on a social network, sending a document by email to the identified recipients, switching or using the private mode of a browser to visit a website, etc.

Figure 3:
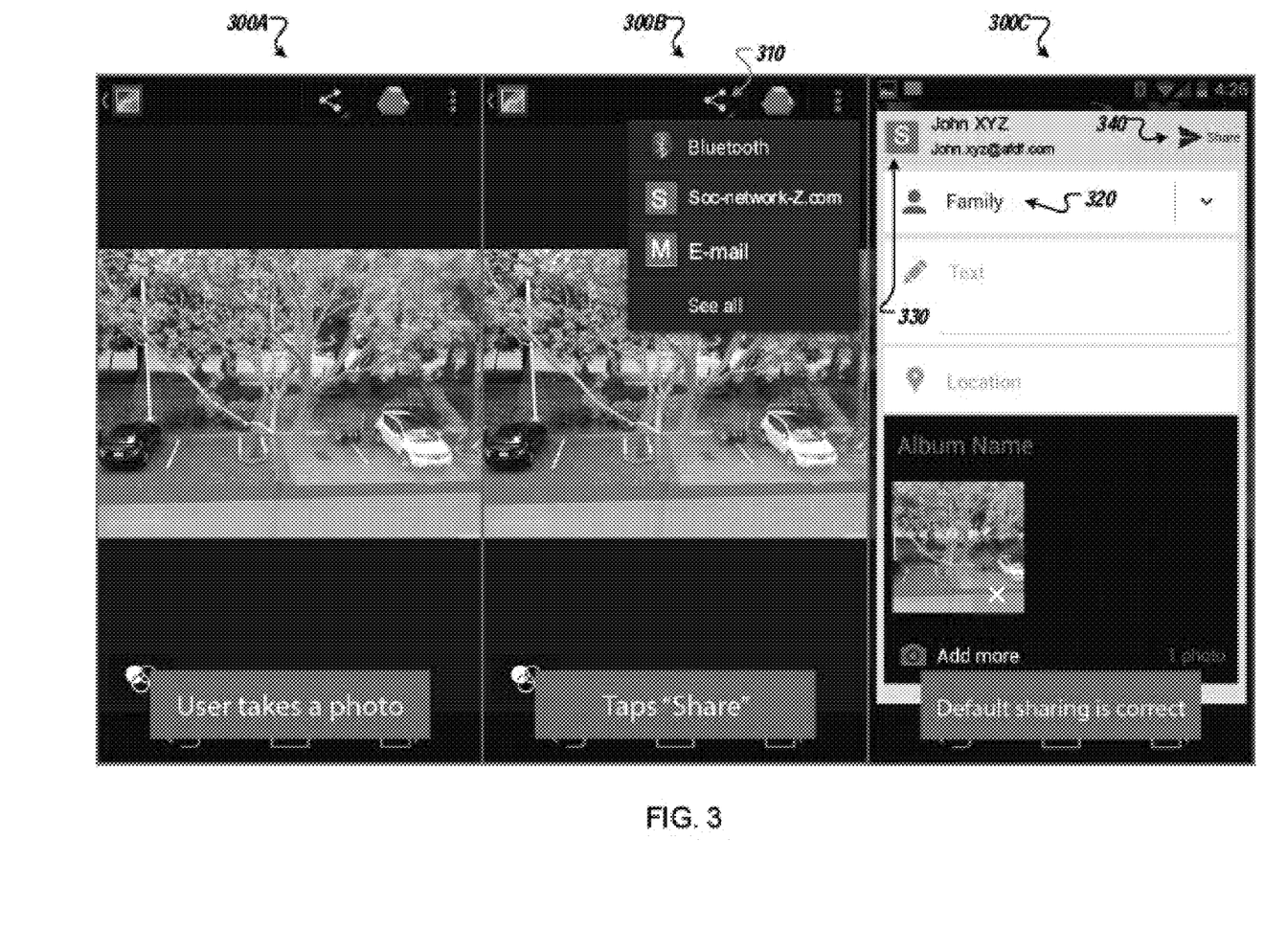
FIG. 3 shows example user interfaces according to some example implementations.

FIG. 3 shows example user interfaces according to some example implementations. The user interface here is described using screenshots 300A-300C of a mobile device. In screenshot 300A, a user takes an action (240, FIG. 2B), which may be taking a photo, saving a photo, or selecting a photo. In some implementations, as shown in screenshot 300B, action 240 is mapped to a more certain intention of the user, such as the user tapping the "Share" button 310. Next, the process of the prediction engine (e.g., blocks 252-256) is executed to arrive at one or more predictions 160, as described in FIG. 2B. In FIG. 3, predictions 160 are shown in screenshots 300B and 300C. Screenshot 300B shows the "shared by" predictions and screenshots 300C shows the "shared with" predictions, which may be based on the user's selections of the "shared by" predictions in screenshot 300B.

The example "shared by" predictions in screenshot 300B are "Bluetooth," "Soc-network-Z.com," "E-mail," and others, which are hidden in the "See all" submenu. The "shared by" predictions may be presented in the order of highest to lowest of predictions certainties or weight scores. For example "Bluetooth," may have a score of 90%, "Soc-network-Z.com" may have a score of 88%, and "E-mail" may have a score of 65%. Other predictions meeting the minimal requirement threshold (e.g., 50%) may be hidden in the "See all" submenu.

In screenshot 300B, for example, the user provides input to select the "Soc-network-Z.com" option, which may be provided as a feedback back to the system as described above. The user's selection leads to screenshot 300C, where the "shared with" predictions may be presented to the user. Share by Soc-network-Z.com 330 is shown, and the user in this example is John XYZ. One prediction is shown predicting that John XYZ would want to share the photo with his "Family" online social circle 320. John can enter more recipients and/or replace the "Family" online social circle, which may be provided as a feedback back to the system as described above. As disclosed above, the example implementation is only performed with the consent of the user, in this case John XYZ.

In screenshot 300C, the prediction of sharing with John's "Family" online social circle is a correct default prediction based on John not changing the prediction. When John presses the "Share" button or widget 340, the photo taken in screenshot 300A is shared with John's "Family" online social circle on Soc-network-Z.com.

In some implementations, the "shared by" predictions and the "shared with" predictions may be presented together in one user interface or screen. For example, in screenshot 300B, next to each "shared by" options may be one or more "shared with" options.

Depending on implementations, different devices or different applications of one device can make use of predictions in different ways. For example, a camera application can pre-populate one or more sharing settings with predicted privacy preferences (e.g. "family" online social circle). In some implementations, predictions or privacy preference may offered as shortcuts and or suggestions (e.g., in addition one or more default settings or predictions), which allow the user to access with a single tap or click. In all example implementations, the user may decide to not participate or consent.

In some implementations, user action prediction may be implemented to apply to batch sharing (e.g., sharing or emailing of media). For example, if Alice takes 10 photos of Alice's relative, then takes 5 photos of a co-worker, then takes 10 more photos of Alice's relative, an implementation of user action prediction may prompt Alice to first share all 20 photos of Alice's relative with Alice's "family" online social circle on a social network, and then prompt Alice to send the 5 photos of Alice's co-worker by email to Alice's team at work (using one or more email addresses). In all example implementations, the user remains in control of participation, and may decide to consent or not consent at any time.

As described above, user action prediction can be implemented to apply to any content, using any application, and in connection with any user action. For example, privacy preferences models based on Alice's browsing may be generated based on Alice's browsing habits and history. The models may be used every time Alice is browsing. One model may indicate that when Alice browsed some kinds of websites (e.g., health information websites) she tends to browse in private mode of the browser. Applying the model, whenever Alice starts browsing a kind of website that Alice typically browses in private mode (and Alice is not browsing in that mode), the browser may either suggest to Alice to use the private mode or automatically enable the private mode, based on Alice's configuration or setting on the browser. As noted above, Alice may decide to consent or not consent.

Figure 4:
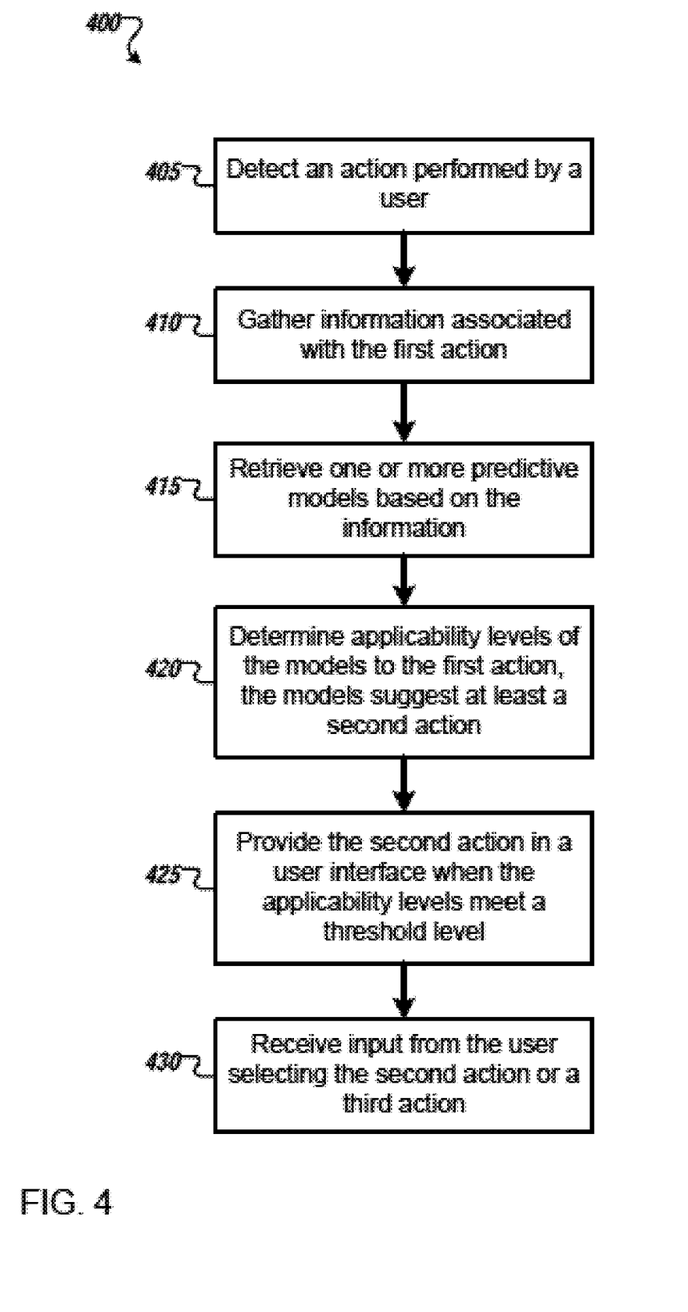
FIG. 4 shows an example of a process implementation.

FIG. 4 shows an example of a process implementation. Process 400 may be implementing the operations of FIG. 2B and/or described in FIG. 3. At block 405, an action performed by a user (e.g., action 240) is detected. At 410, information (e.g., IACA) associated with the first action and/or the content in connection with the first action is gathered, collected, identified, or extracted. At 415, one or more predictive models based on the information collected at 410 are identified, selected, or retrieved. At 420, applicability levels of the predictive models to the first action are determined, for example, using weights as described in block 256, FIG. 2B. Each predictive model suggests or predicts at least a predicted action (e.g., an action of selecting who to share content with and/or an action of selecting how the content is shared by, such as using what application to share the content).

At 425, one or more predicted actions from the models, determined to be used based on the applicability levels meeting a threshold level, are provided or presented in a user interface. At 430, input from a user is received selecting one predicted action or another predicted action (or modifying a predicted action or providing an action not predicted). The action selected in 430 is performed. The user's selection or input may be provided as feedback to the system, for example, to improve the system (e.g., accuracy, performance, predictions, etc.).

In some examples, process 400 may be implemented with different, fewer, or more blocks. Process 400 may be implemented as computer executable instructions, which can be stored on a medium, loaded onto one or more processors of one or more computing devices, and executed as a computer-implemented method.

Figure 5:
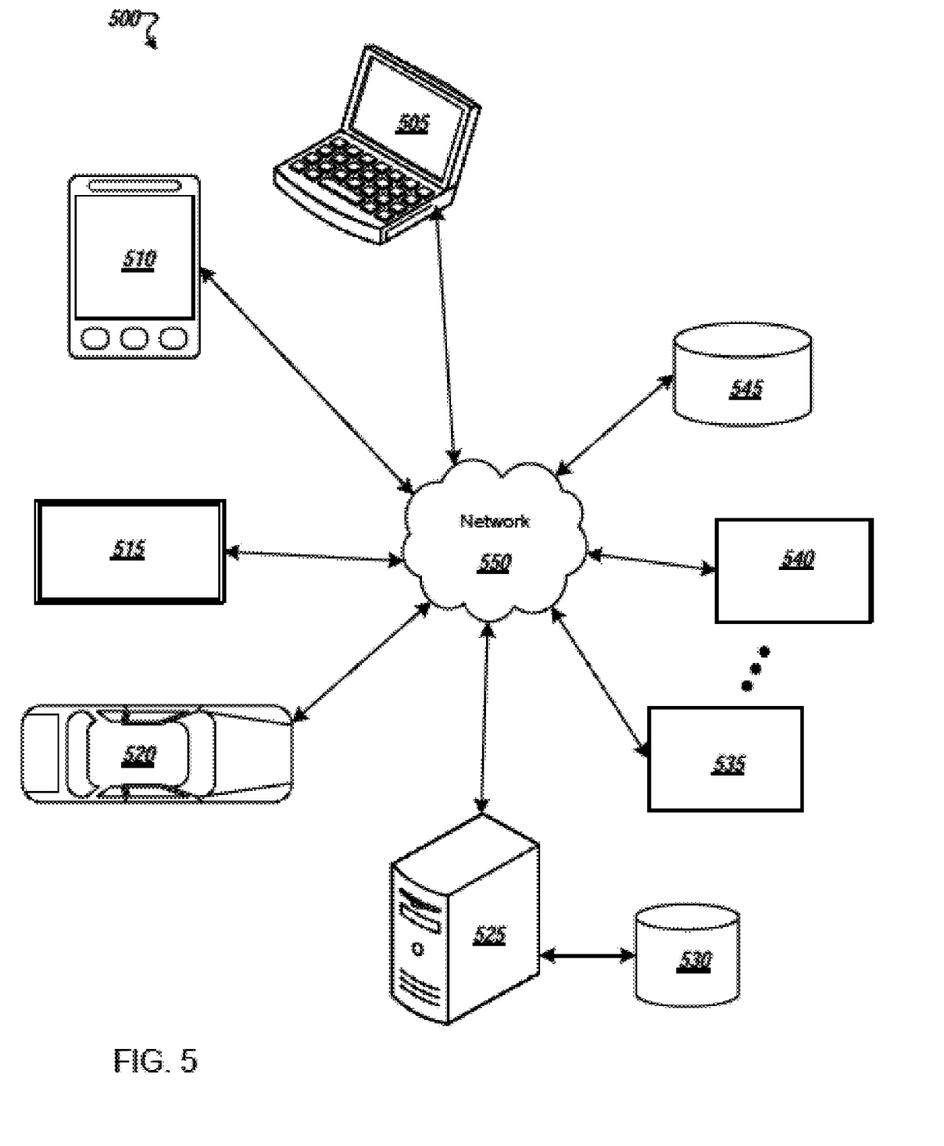
FIG. 5 shows an example environment suitable for some example implementations.

FIG. 5 shows an example environment suitable for some example implementations. Environment 500 includes devices 505-545, and each is communicatively connected to at least one other device via, for example, network 560 (e.g., by wired and/or wireless connections). Some devices may be communicatively connected one or more storage devices 520 and 545.

An example of one or more devices 505-545 may be computing device 605 described below in FIG. 6. Devices 505-545 may include, but are not limited to, a computer 505 (e.g., a laptop computing device), a mobile device 510 (e.g., smartphone or tablet), a television 515, a device associated with a vehicle 520, a server computer 525, computing devices 535-540, storage 530 and 545.

In some implementations, devices 505-520 may be considered user devices, such as devices used by users to create content and/or issue requests, such as sharing content on a social network. Devices 525-545 may be devices associated with service providers (e.g., used by service providers to provide services and/or store data, such as webpages, text, text portions, images, image portions, audios, audio segments, videos, video segments, and/or information thereabout).

For example, a user (e.g., Alice) may access, view, and/or share content or a photo using user device 510 on a social network supported by one or more devices 525-545. Device 510 may be running an application that implements guided user actions or user action prediction. After Alice takes a photo with device 510, as shown in FIG. 3, Alice taps the "Share" button 310. The application that implements guided user actions used models generated based on Alice's history data to provide one or more predictions, as shown in screenshots 300B-C. Alice taps the "Share" button 340 to accept the default or predicted sharing action, which may include who to share the photo with and how to share the photo by (e.g., using what application or service to share the photo).

Figure 6:
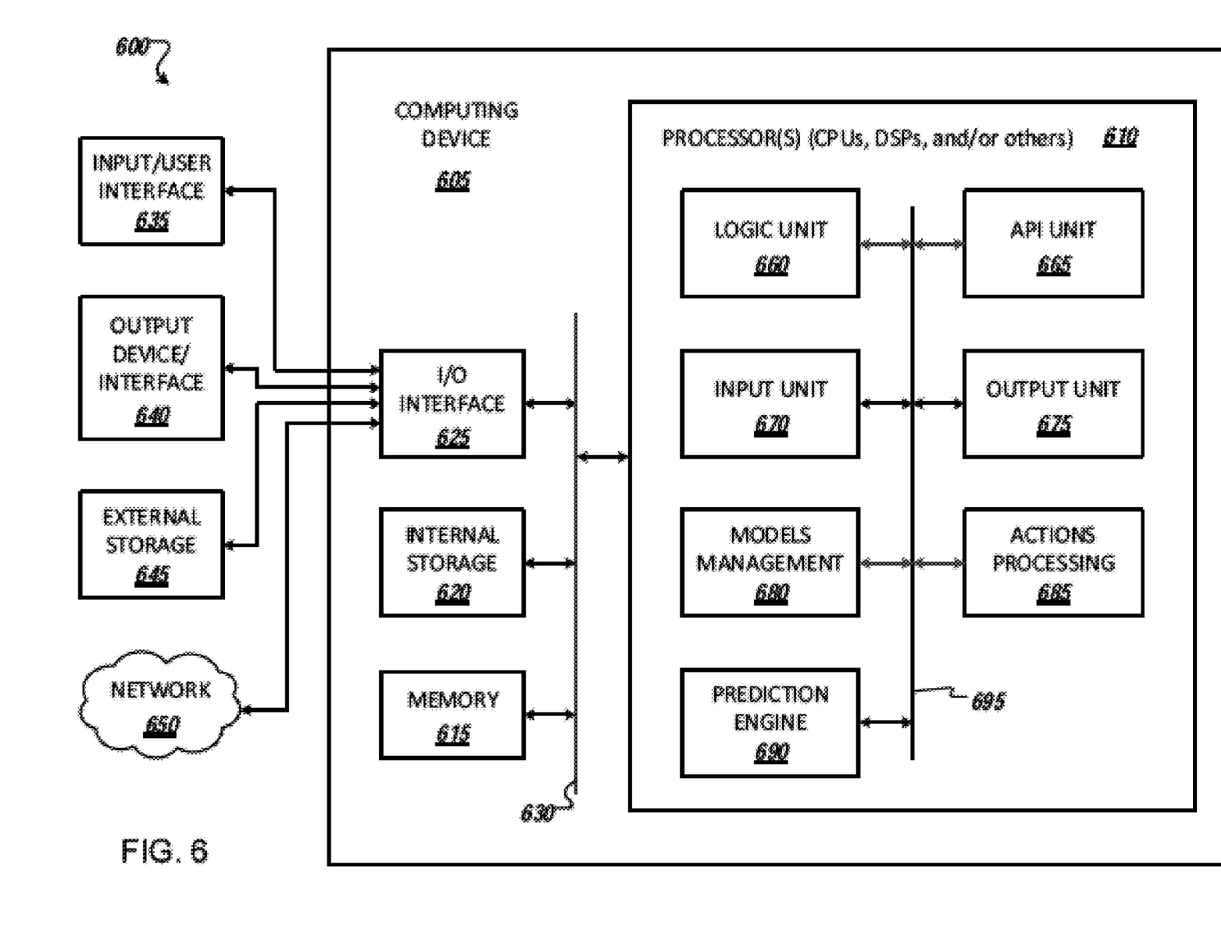
FIG. 6 shows an example computing environment with an example computing device suitable for use in some example implementations.

FIG. 6 shows an example computing environment with an example computing device suitable for use in some example implementations. Computing device 605 in computing environment 600 can include one or more processing units, cores, or processors 610, memory 615 (e.g., RAM, ROM, and/or the like), internal storage 620 (e.g., magnetic, optical, solid state storage, and/or organic), and/or I/O interface 625, any of which can be coupled on a communication mechanism or bus 630 for communicating information or embedded in the computing device 605.

Computing device 605 can be communicatively coupled to input/user interface 635 and output device/interface 640. Either one or both of input/user interface 635 and output device/interface 640 can be a wired or wireless interface and can be detachable. Input/user interface 635 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 640 may include a display, television, monitor, printer, speaker, braille, or the like. In some example implementations, input/user interface 635 and output device/interface 640 can be embedded with or physically coupled to the computing device 605. In other example implementations, other computing devices may function as or provide the functions of input/user interface 635 and output device/interface 630 for a computing device 605.

Examples of computing device 605 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 605 can be communicatively coupled (e.g., via I/O interface 625) to external storage 645 and network 650 for communicating with any number of networked components, devices, and systems, including one or more computing devices of the same or different configuration. Computing device 605 or any connected computing device can be functioning as, providing services of, or referred to as a server, client, thin server, general machine, special-purpose machine, or another label.

I/O interface 625 can include, but is not limited, to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 600. Network 650 can be any network or combination of networks (e.g., the Internet, local area network, wide area network, a telephonic network, a cellular network, satellite network, and the like).

Computing device 605 can use and/or communicate using computer-usable or computer-readable media, including transitory media and non-transitory media. Transitory media include transmission media (e.g., metal cables, fiber optic), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 605 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 610 can execute under any operating system (OS) (not shown), in a native or virtual environment. One or more applications can be deployed that include logic unit 660, application programming interface (API) unit 665, input unit 670, output unit 675, models management 680, actions processing 685, prediction engine 690, and inter-unit communication mechanism 695 for the different units to communicate with each other, with the OS, and with other applications (not shown). For example, models management 680, actions processing 685, and prediction engine 690 may implement one or more processes described and shown in FIGS. 1-5. The described units and elements can be varied in design, function, configuration, or implementation and are not limited to the descriptions provided.

In some example implementations, when information or an execution instruction is received by API unit 665, it may be communicated to one or more other units (e.g., logic unit 660, input unit 670, output unit 675, models management 680, actions processing 685, and prediction engine 690). For example, after input unit 670 has detected a user action, prediction engine 690 process that action and interfaces with models management 680 to retrieve one or more predictive models to provide one of more predicted actions. The models may be generated by actions processing 685 based on previous actions or user history. Input unit 670 may then provide input from a user selecting or modifying one of the predicted actions. Output unit 675 then performs the final action based on the user's input.

In some instances, logic unit 660 may be configured to control the information flow among the units and direct the services provided by API unit 665, input unit 670, output unit 675, models management 680, actions processing 685, and prediction engine 690 in some example implementations described above. For example, the flow of one or more processes or implementations may be controlled by logic unit 660 alone or in conjunction with API unit 665.

In situations in which the systems discussed here collect persona information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer-implemented method, comprising:
   detecting a first action performed by a user;
   gathering information associated with the first action;
   applying machine learning to generate a predictive model and a privacy preference of the user, based on the information and a past sharing action associated with the information, wherein the machine learning is applied as a black box that receives the information and outputs the predictive model, and wherein a plurality of pipelines are provided for a plurality of respective domains, each of the pipelines applying the machine learning;
   determining an applicability level of the predictive model to the first action, wherein the predictive model suggests a second action;
   providing the second action in a user interface for the applicability level exceeding a first threshold level associated with a degree of sharing of content associated with the first action;
   receiving input from the user selecting the second action or a third action for the applicability level exceeding the first threshold level and not exceeding a second threshold level that exceeds the first threshold level; and
   for the applicability level exceeding the second threshold level, automatically selecting the second action or the third action based on the provided second action without receiving the input from the user.

2. The method of claim 1, wherein the first action comprises browsing one or more online sites in an open mode, and the second action comprises predicting a user preference to browse in a private mode based on an identity of the one or more online sites, and providing the user with an option to switch from the open mode to a private mode, wherein the machine learning is applied to fine-tune the system based on the input of the user associated with the provided option.

3. The method of claim 1, wherein the first action comprises identifying content and the second action comprises selecting an application to process the content.

4. The method of claim 1, wherein the first action comprises accessing a website and the second action comprises selecting a mode of a browser to access the website.

5. The method of claim 1, wherein the plurality of pipelines comprise a first pipeline associated with browsing activity, a second pipeline associated with sharing activity on an online social circle of a social network, and a third pipeline associated with email communication.

6. The method of claim 1, wherein the determining the applicability level of the predictive model to the first action comprises:
   performing a weighted calculation of attributes associated with the predictive model; and
   determining a combination of at least some of the weighted calculation of the attributes meet the first threshold level.

7. The method of claim 1, wherein input from the user selecting the second action or a third action modifies the predictive model.

8. A non-transitory computer readable medium having stored therein computer executable instructions for:
   detecting a first action performed by a user;
   gathering information associated with the first action;
   applying machine learning to generate a predictive model and a privacy preference of the user, based on the information and a past sharing action associated with the information, wherein the machine learning is applied as a black box that receives the information and outputs the predictive model, and wherein a plurality of pipelines are provided for a plurality of respective domains, each of the pipelines applying the machine learning;
   determining an applicability level of the predictive model to the first action, wherein the predictive model suggests a second action;

providing the second action in a user interface for the applicability level exceeding a first threshold level associated with a degree of sharing of content associated with the first action;

receiving input from the user selecting the second action or a third action for the applicability level exceeding the first threshold level and not exceeding a second threshold level that exceeds the first threshold level; and for the applicability level exceeding the second threshold level, automatically selecting the second action or the third action based on the provided second action without receiving the input from the user.

9. The medium of claim 8, wherein the first action comprises browsing one or more online sites in an open mode, and the second action comprises predicting a user preference to browse in a private mode based on an identity of the one or more online sites, and providing the user with an option to switch from the open mode to a private mode, wherein the machine learning is applied to fine-tune the system based on the input of the user associated with the provided option.

10. The medium of claim 8, wherein the first action comprises identifying content and the second action comprises selecting an application to process the content.

11. The medium of claim 8, wherein the first action comprises accessing a website and the second action comprises selecting a mode of a browser to access the website.

12. The medium of claim 8, wherein the plurality of pipelines comprise a first pipeline associated with browsing activity, a second pipeline associated with sharing activity on an online social circle of a social network, and a third pipeline associated with email communication.

13. The medium of claim 8, wherein the determining the applicability level of the predictive model to the first action comprises:
performing a weighted calculation of attributes associated with the predictive model; and
determining a combination of at least some of the weighted calculation of the attributes meet the first threshold level.

14. At least one computing device comprising storage and a processor configured to perform:
detecting a first action performed by a user;
gathering information associated with the first action;
applying machine learning to generate a predictive model and a privacy preference of the user, based on the information and a past sharing action associated with the information, wherein the machine learning is applied as a black box that receives the information and outputs the predictive model, and wherein a plurality of pipelines are provided for a plurality of respective domains, each of the pipelines applying the machine learning;

determining an applicability level of the predictive model to the first action, wherein the predictive model suggests a second action;

providing the second action in a user interface for the applicability level exceeding a first threshold level associated with a degree of sharing of content associated with the first action;

receiving input from the user selecting the second action or a third action for the applicability level exceeding the first threshold level and not exceeding a second threshold level that exceeds the first threshold level; and for the applicability level exceeding the second threshold level, automatically selecting the second action or the third action based on the provided second action without receiving the input from the user.

15. The at least one computing device of claim 14, wherein the first action comprises browsing one or more online sites in an open mode, and the second action comprises predicting a user preference to browse in a private mode based on an identity of the one or more online sites, and providing the user with an option to switch from the open mode to a private mode, wherein the machine learning is applied to fine-tune the system based on the input of the user associated with the provided option.

16. The at least one computing device of claim 14, wherein the first action comprises identifying content and the second action comprises selecting an application to process the content.

17. The at least one computing device of claim 14, wherein the first action comprises accessing a website and the second action comprises selecting a mode of a browser to access the website.

18. The at least one computing device of claim 14, wherein the plurality of pipelines comprise a first pipeline associated with browsing activity, a second pipeline associated with sharing activity on an online social circle of a social network, and a third pipeline associated with email communication.

19. The at least one computing device of claim 14, wherein the determining the applicability level of the predictive model to the first action comprises:
performing a weighted calculation of attributes associated with the predictive model; and
determining a combination of at least some of the weighted calculation of the attributes meet the first threshold level.

20. The at least one computing device of claim 14, wherein input from the user selecting the second action or a third action modifies the predictive model.

* * * * *